Nov. 24, 1936.  O. L. BEAUMIER  2,061,693
STUFFING BOX
Filed Jan. 27, 1936
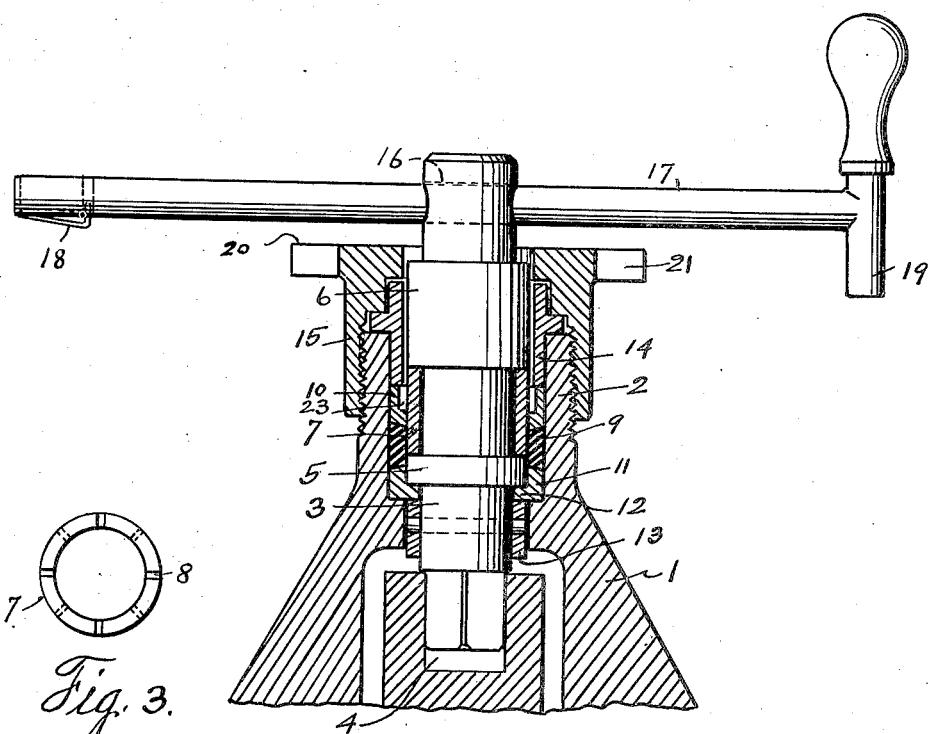
Fig. 1.
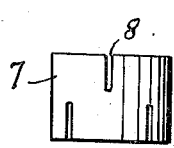
Fig. 3.
Fig. 4.
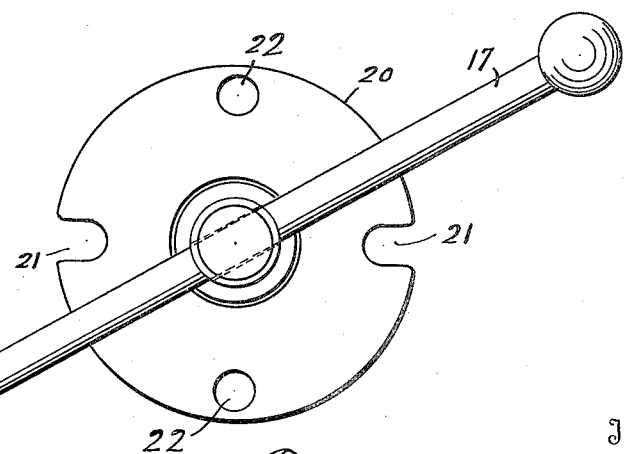
Fig. 2.
Inventor
Oscar L. Beaumier
By
Hardway Cathey
Attorneys Patented Nov. 24, 1936

2,061,693

UNITED STATES PATENT OFFICE 2,061,693

STUFFING BOX

Oscar L. Beaumier, Brenham, Tex.

Application January 27, 1936, Serial No. 60,978

7 Claims. (Cl. 251—48)

This invention relates to a stuffing box.

An object of the invention is to provide a novel type of packing, or stuffing box, for a valve stem or other rotatable part.

Another object of the invention is to provide a novel type of stuffing box or packing assembly whereby a fluid tight joint will be formed between the valve stem and valve bonnet, or similar rotatable and stationary parts, with a minimum of friction between the packing and the stem or other rotatable part.

A further object is to provide novel means for regulating the compression of the packing.

With the above and other objects in view, the invention has particular relation to certain novel features of construction, operation, and arrangement of parts, an example of which is given in this specification and illustrated in the accompanying drawing, wherein:—

Figure 1 shows a fragmentary sectional view of a valve showing the stuffing box in section.

Figure 2 shows a plan view,

Figure 3 shows an end view of an antifriction sleeve employed, and

Figure 4 shows a side view thereof.

Referring now more particularly to the drawing, wherein like numerals of reference designate similar parts in each of the figures, the numeral 1 designates the bonnet of a valve casing which terminates in the sleeve-like housing 2. The numeral 3 designates the valve stem arranged axially in the bonnet and whose inner end is polygonal so as to fit into a correspondingly shaped socket 4 in the part to be actuated by the stem. The stem has an annular external rib 5 therearound and also has a relatively wide external rib 6 thereon which is spaced outwardly from the rib 5 and between these ribs and fitted closely around the stem and rotatable relative thereto there is an antifriction sleeve 7. This sleeve has the end slots 8 cut therethrough arranged in staggered relation. There is a packing 9 fitted within the housing 2 and closely surrounding the sleeve 7, the inner end of said packing overlapping the rib 5. There are the outer and inner rings 10, 11 in abutting relation with outer and inner ends, respectively, of the packing sleeve 9. The ring 11 fits around the rib 5 and its inner end is formed with the inwardly extended flange 12 which fits closely around the stem 3 and fits against the inner end of the rib 5. A collar 13 surrounds the stem 3 and is fastened thereon and abuts the inner side of the flange 12.

A gland 14 is fitted within the outer end of the housing 2 and abuts the outer ring 10 and a flange nut 15 is threaded onto the housing 2 and abuts the outer end of the gland 14 and maintains said gland in place with the packing 9 under proper compression.

As the stem 3 is turned to manipulate the valve it will be relieved of considerable friction by the sleeve 7 so that the stem may at all times be easily turned. The inner end of the packing, however, will surround and be in close contact with the rib 5 so as to form a fluid tight joint.

The outer end of the stem 3 has a transverse bearing 16 through which the wrench 17 is slidable. This wrench has a depressible latch 18 at one end to prevent its accidental detachment from the stem and its other end is downwardly turned forming the stud 19. The wrench 17 may be turned to correspondingly turn the stem 3 and the valve connected with the stem correspondingly manipulated.

The gland 15 is formed with an outer end flange 20 having the opposing notches 21, 21, and said flange also has the oppositely arranged holes 22, 22.

The wrench 17 is at all times ready for use in turning the stem 3 to open or close the valve and when it is desired to tighten up on the packing the wrench may be moved so as to engage the stud 19 in one of the notches 21 and the nut 15 may be tightened up or relieved as desired or if it be desired to tighten up or release the nut 15 without turning the stem 3, the wrench may be removed from the stem and the stud 19 engaged in one of the openings 22 and the wrench then revolved acting against the stem as a fulcrum.

In order to repack the valve stem the nut 15 may be unscrewed and the stem and packing assembly lifted out and a new packing substituted for the worn packing and the packing assembly and gland then replaced all while the valve is in open or closed position.

In order to lubricate the bearing between the stem 3 and sleeve 7 a lubricant may be supplied around the outer end of the stem and it will find its way downwardly into the chamber 23 formed by counterboring the ring 10, as shown in Figure 1 and from said chamber will pass through the slots 8 to lubricate the stem 3.

The drawing and description disclose what is now considered to be a preferred form of the invention by way of illustration only, while the broad principle of the invention will be defined by the appended claims.

What I claim is:

1. In a valve having a casing and a bonnet thereon: a rotatable stem mounted axially in the bonnet, packing in the bonnet around the stem, retaining rings in the bonnet between which the packing is located, an anti-friction sleeve around the stem within the packing and in which the stem is rotatable, means for confining the sleeve against end wise movement on the stem and a nut threaded to the bonnet for regulating the compression on the packing.

2. In a valve having a casing and a bonnet thereon: a rotatable stem mounted axially in the bonnet, an annular rib on the stem, a ring mounted on and surrounding the rib, a sleeve-like packing in the bonnet around the stem and in abutting relation with said ring, a sleeve around the stem within the packing adapted to reduce the friction between the stem and packing said sleeve being held stationary by the packing and the stem being rotatable in the sleeve, and means for regulating the compression on said packing.

3. In a valve having a bonnet for mounting on the valve casing: a rotatable stem mounted axially in the bonnet, packing in the bonnet around the stem, a nut threaded to the bonnet to regulate the compression on the packing, a wrench having a slidable connection with the outer end of the stem, and interengaging means carried by the nut and wrench, respectively, whereby the nut may be turned by the wrench.

4. In a valve, a bonnet, an axial stem rotatable therein, an annular rib on the stem, an anti-friction sleeve in which the stem is rotatable, means for confining the sleeve against endwise movement on the stem, packing around the sleeve and in contact with the rib, rings abutting the respective ends of the packing and a means for regulating the compression on the packing.

5. In a valve having a bonnet and an axial stem rotatably mounted in the bonnet, a packing assembly in the bonnet around the stem, means having a threaded connection with the bonnet to regulate the compression of the packing, a wrench having a slidable connection with the outer end of the stem and one end of which is formed with a stud, the outer end of the compression regulating means having bearings to receive the stud whereby said means may be turned upon revolving the wrench.

6. In a valve, a casing, a rotatable stem therein, spaced abutments on the stem, a sleeve about the stem between said abutments, said stem being freely rotatable in the sleeve, packing in the casing around the sleeve and holding the sleeve stationary and forming a fluid-tight joint with one of said abutments, retaining rings around the stem between which the packing is located, and means for regulating the compression on the packing.

7. In a valve, a casing, a rotatable stem therein, spaced abutments on the stem, a sleeve about the stem between said abutments, and in which the stem is freely rotatable, packing in the casing around the sleeve and holding the sleeve stationary and forming a fluid-tight joint with one of said abutments, retaining rings around the stem between which the packing is located, one of the retaining rings surrounding and being in close contact with one of said abutments, and means for regulating the compression on the packing.

OSCAR L. BEAUMIER.